(12) United States Patent
Lee et al.

(10) Patent No.: US 8,804,624 B1
(45) Date of Patent: *Aug. 12, 2014

(54) WIRELESS COMMUNICATION DEVICE WITH TRANSMISSION CHARACTERISTIC CONTROL OF COEXISTENT TRANSCEIVERS

(71) Applicant: Marvell International Ltd., Hamilton (BM)

(72) Inventors: George Lee, San Jose, CA (US); Lance Nagamine, Fremont, CA (US); Zhenyu Zhang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,784

(22) Filed: Dec. 11, 2012

Related U.S. Application Data

(63) Continuation of application No. 12/463,473, filed on May 11, 2009, now Pat. No. 8,331,289.

(51) Int. Cl.
*H04W 4/00* (2009.01)
*H04W 88/06* (2009.01)

(52) U.S. Cl.
CPC .................................... *H04W 88/06* (2013.01)
USPC ........................................................ 370/328

(58) Field of Classification Search
CPC . H04W 88/06; H04W 28/04; H04W 72/1215; H04W 16/14; H04W 52/0225
USPC ........ 370/310, 328, 338; 455/39, 41.2, 73, 78
See application file for complete search history.

(56) References Cited

U.S. PATENT DOCUMENTS

| | | | | |
|---|---|---|---|---|
| 6,941,110 | B2* | 9/2005 | Kloper et al. | 455/67.11 |
| 7,146,133 | B2* | 12/2006 | Bahl et al. | 455/63.1 |
| 7,454,171 | B2* | 11/2008 | Palin et al. | 455/41.2 |
| 7,610,057 | B2* | 10/2009 | Bahl et al. | 455/522 |
| 7,697,897 | B2* | 4/2010 | Duerdodt et al. | 455/63.1 |
| 7,818,029 | B2* | 10/2010 | Sanguinetti | 455/552.1 |
| 7,925,297 | B2* | 4/2011 | Zhu et al. | 455/553.1 |
| 8,200,161 | B2* | 6/2012 | Walley et al. | 455/63.1 |
| 8,254,343 | B2* | 8/2012 | Liu et al. | 370/336 |
| 2004/0192222 | A1* | 9/2004 | Vaisanen et al. | 455/78 |
| 2004/0259589 | A1* | 12/2004 | Bahl et al. | 455/553.1 |
| 2006/0114864 | A1* | 6/2006 | Fuccello et al. | 370/338 |
| 2006/0292986 | A1* | 12/2006 | Bitran et al. | 455/41.2 |

(Continued)

*Primary Examiner* — Chi Pham
*Assistant Examiner* — Robert Lopata

(57) ABSTRACT

A wireless communication device including a first transceiver, a second transceiver, and a coexistence module. The first transceiver transmits a first signal and operates according to a first wireless communication standard. The second transceiver selects a first channel of multiple channels and transmits a second signal on the first channel. The second transceiver operates according to a second wireless communication standard. The first channel is associated with a frequency. The coexistence module, based on the frequency of the first channel, alters a transmission characteristic of the first signal to be transmitted by the first transceiver and alters a transmission characteristic of the second signal to be transmitted by the second transceiver. The transmission characteristic of the first signal and the transmission characteristic of the second signal, as altered by the coexistence module, prevent interference with the first signal and the second signal.

20 Claims, 7 Drawing Sheets

(56) References Cited

U.S. PATENT DOCUMENTS

| | | | |
|---|---|---|---|
| 2007/0066222 A1* | 3/2007 | Tao et al. | 455/41.2 |
| 2007/0275746 A1* | 11/2007 | Bitran | 455/509 |
| 2008/0045152 A1* | 2/2008 | Boes | 455/63.1 |
| 2008/0238807 A1* | 10/2008 | Ibrahim et al. | 343/876 |
| 2009/0239471 A1* | 9/2009 | Tran et al. | 455/41.2 |
| 2010/0210223 A1* | 8/2010 | Gorbachov | 455/78 |
| 2010/0226348 A1* | 9/2010 | Thoukydides | 370/338 |
| 2011/0194546 A1* | 8/2011 | Sanguinetti | 370/338 |

* cited by examiner

US 8,804,624 B1

WIRELESS COMMUNICATION DEVICE WITH TRANSMISSION CHARACTERISTIC CONTROL OF COEXISTENT TRANSCEIVERS

CROSS-REFERENCE TO RELATED APPLICATIONS

The present disclosure is a continuation of U.S. patent application Ser. No. 12/463,473, filed May 11, 2009 (now U.S. Pat. No. 8,331,289). The entire disclosure of the application referenced above is incorporated herein by reference.

FIELD

The present disclosure relates generally to wireless communications. More particularly, the present disclosure relates to Wi-Fi/Bluetooth coexistence.

BACKGROUND

The increase in the number of handheld platforms in recent years has created a need to integrate multiple networking technologies on a single integrated circuit. Of these networking technologies, the two most widely used are wireless local-area networking (WLAN, also known as Wi-Fi) and Bluetooth. Both of these technologies use the same un-licensed 2.4 GHz Industrial, Scientific and Medical (ISM) band. This situation poses a difficult problem for designing integrated circuits and external logic components that allow both of these technologies to simultaneously coexist. In order for the end user to use both of these technologies on the same device simultaneously, these two technologies are required to coexist both in time and frequency.

SUMMARY

A wireless communication device is provided and includes a first transceiver, a second transceiver, and a coexistence module. The first transceiver is configured to (i) transmit a first signal, and operate according to a first wireless communication standard. The second transceiver is configured to select a first channel of multiple channels, and transmit a second signal on the first channel. The second transceiver operates according to a second wireless communication standard. The first channel is associated with a frequency. The coexistence module is configured to, based on the frequency of the first channel, alter a transmission characteristic of the first signal to be transmitted by the first transceiver, and alter a transmission characteristic of the second signal to be transmitted by the second transceiver. The transmission characteristic of the first signal and the transmission characteristic of the second signal, as altered by the coexistence module, prevent interference (i) between the first signal and a signal received by the second transceiver, and (ii) between the second signal and a signal received by the first transceiver.

In general, in one aspect, an apparatus is provided and includes: an antenna; a wireless local-area network (WLAN) transceiver; a Bluetooth transceiver; a switch controller adapted to provide switch control signals; and a switch module adapted to selectively electrically couple the WLAN transceiver and the Bluetooth transceiver to the antenna in accordance with the switch control signals.

Implementations of the apparatus can include one or more of the following features. In some implementations, the WLAN transceiver is compliant with all or part of IEEE standard; and the Bluetooth transceiver is compliant with the Bluetooth standard issued by the Bluetooth Special Interest Group. In some implementations, the switch module includes: a single-pole triple-throw (SP3T) switch. A common node of the SP3T switch is electrically coupled to the antenna. A first switched node of the SP3T switch is electrically coupled to a transmit node of the WLAN transceiver. A divider is included, where an input of the divider is electrically coupled to a second switched node of the SP3T switch. A first output of the divider is electrically coupled to a receive node of the WLAN transceiver. A single-pole double-throw (SPDT) switch is included, where a common node of the SPDT switch is electrically coupled to the Bluetooth transceiver. A first switched node of the SPDT switch is electrically coupled to a second output of the divider. A second switched node of the SPDT switch is electrically coupled to a third switched node of the SP3T switch.

Some implementations include a power amplifier electrically coupled between the transmit node of the WLAN transceiver and the first switched node of the SP3T switch. A bypass switch is adapted to bypass the power amplifier when the antenna is receiving a wireless Bluetooth signal.

In some implementations, the switch module includes a single-pole double-throw (SPDT) switch, where a common node of the SPDT switch is electrically coupled to the antenna. A first switched node of the SPDT switch is electrically coupled to a transmit node of the WLAN transceiver. A coupler is included, where a first node of the coupler is electrically coupled to a second switched node of the SPDT switch. A second node of the coupler is electrically coupled to a receive node of the WLAN transceiver. A third node of the coupler is electrically coupled to the Bluetooth transceiver.

Some implementations include a power amplifier electrically coupled between the transmit node of the WLAN transceiver and the first switched node of the SPDT switch. A bypass switch is adapted to bypass the power amplifier when the antenna is receiving a wireless Bluetooth signal.

In some implementations, the switch module includes a single-pole triple-throw (SP3T) switch, where a common node of the SP3T switch is electrically coupled to the antenna. A first switched node of the SP3T switch is electrically coupled to a transmit node of the WLAN transceiver. A coupler is included, where a first node of the coupler is electrically coupled to a second switched node of the SP3T switch. A first single-pole double-throw (SPDT) switch is included, where a first switched node of the first SPDT switch is electrically coupled to a third switched node of the SP3T switch. A second switched node of the first SPDT switch is electrically coupled to a second node of the coupler. A power splitter is included, where an input of the power splitter is electrically coupled to a common node of the first SPDT switch. A first output of the power splitter is electrically coupled to a receive node of the WLAN receiver. A second SPDT switch is included, where a first switched node of the second SPDT switch is electrically coupled to a third node of the coupler. A second switched node of the second SPDT switch is electrically coupled to a second output of the power splitter. A common node of the second SPDT switch is electrically coupled to the Bluetooth transceiver. Some implementations include a power amplifier electrically coupled between the transmit node of the WLAN transceiver and the first switched node of the SP3T switch. A bypass switch adapted to bypass the power amplifier when the antenna is receiving a wireless Bluetooth signal.

In some implementations, the switch module includes a first single-pole double-throw (SPDT) switch, where a common node of the first SPDT switch is electrically coupled to the antenna. A coupler is included, where a first node of the coupler is electrically coupled to a first switched node of the first SPDT switch. A second SPDT switch is included, where a first switched node of the second SPDT switch is electrically coupled to a second switched node of the first SPDT switch. A second switched node of the second SPDT switch is electrically coupled to a second node of the coupler. A power combiner is included, where an output of the power combiner is electrically coupled to a third node of the coupler. A first input of the power combiner is electrically coupled to a transmit node of the WLAN transceiver. A power splitter is included, where an input of the power splitter is electrically coupled to a common node of the second SPDT switch. A first output of the power splitter is electrically coupled to a receive node of the WLAN transceiver. A third SPDT switch is included, where a first switched node of the third SPDT switch is electrically coupled to a second input of the power combiner. A second switched node of the third SPDT switch is electrically coupled to a second output of the power splitter. A common node of the third SPDT switch is electrically coupled to the Bluetooth transceiver.

Some implementations include a power amplifier electrically coupled between the transmit node of the WLAN transceiver and the first input of the power combiner; and a bypass switch adapted to bypass the power amplifier when the antenna is receiving a wireless Bluetooth signal. Some implementations include a wireless communication device including the apparatus. In some implementations, the wireless communication device is implemented as one of: a mobile telephone; a personal digital assistant (PDA); and a personal computer.

In general, in one aspect, an apparatus is provided and includes a transceiver module adapted to transceive wireless signals. The transceiver module includes a wireless local-area network (WLAN) transceiver adapted to transceive WLAN signals, and a Bluetooth transceiver adapted to adapted to transceive Bluetooth signals on multiple Bluetooth frequency channels each selected according to a frequency-hopping pattern. The Bluetooth frequency channels are chosen to avoid interference between the Bluetooth signals and the WLAN signals. A coexistence module is adapted to cause the transceiver module to dynamically alter one or more transmission characteristics of the wireless signals based on the frequency of the selected Bluetooth frequency channel. The characteristics include at least one of a transmission power of the Bluetooth transceiver, a transmission power of the WLAN transceiver, a packet length of a packet transmitted by the WLAN transceiver, a data rate of a packet transmitted by the WLAN transceiver, and a link partner selection of the WLAN transceiver.

Implementations of the apparatus can include one or more of the following features. In some implementations, the WLAN transceiver is compliant with all or part of IEEE standard. The Bluetooth transceiver is compliant with the Bluetooth standard issued by the Bluetooth Special Interest Group. In some implementations, the coexistence module includes a memory adapted to store associations between the transmission characteristics and the respective Bluetooth frequency channels. A coexistence module dynamically alters the one or more transmission characteristics of the transceiver module according to the associations. Some implementations include a wireless communication device including the apparatus. In some implementations, the wireless communication device is implemented as one of: a mobile telephone; a personal digital assistant (PDA); and a personal computer.

In general, in one aspect, a method is provided and includes: transceiving wireless signals; including transceiving wireless local-area network (WLAN) signals; and transceiving Bluetooth signals on multiple Bluetooth frequency channels each selected according to a frequency-hopping pattern. The Bluetooth frequency channels are chosen to avoid interference between the Bluetooth signals and the WLAN signals. One or more transmission characteristics of the wireless signals are dynamically altered based on the frequency of the selected Bluetooth frequency channel. The characteristics include at least one of a transmission power of the Bluetooth signals, a transmission power of the WLAN signals, a packet length of a packet represented by the WLAN signals, a data rate of a packet transmitted by the WLAN transceiver, and a link partner for the WLAN signals.

Implementations of the method can include one or more of the following features. In some implementations, the WLAN signals are compliant with all or part of IEEE standard. The Bluetooth signals are compliant with the Bluetooth standard issued by the Bluetooth Special Interest Group. Some implementations include storing associations between the transmission characteristics and the respective Bluetooth frequency channels. The one or more transmission characteristics of the wireless signals are dynamically altered according to the associations.

The details of one or more implementations are set forth in the accompanying drawings and the description below. Other features will be apparent from the description and drawings, and from the claims.

BRIEF DESCRIPTION OF DRAWINGS

The leading digit(s) of each reference numeral used in this specification indicates the number of the drawing in which the reference numeral first appears.

DESCRIPTION

Implementations of the present disclosure provide simultaneous coexistence for wireless local-area networking (WLAN, also known as Wi-Fi) and Bluetooth. According to some implementations, a single antenna is shared by a WLAN transceiver and a Bluetooth transceiver. A switch module is provided to selectively electrically couple the WLAN transceiver and the Bluetooth transceiver to the antenna in accordance with switch control signals provided by a switch controller. Several implementations are described below.

Figure 1:
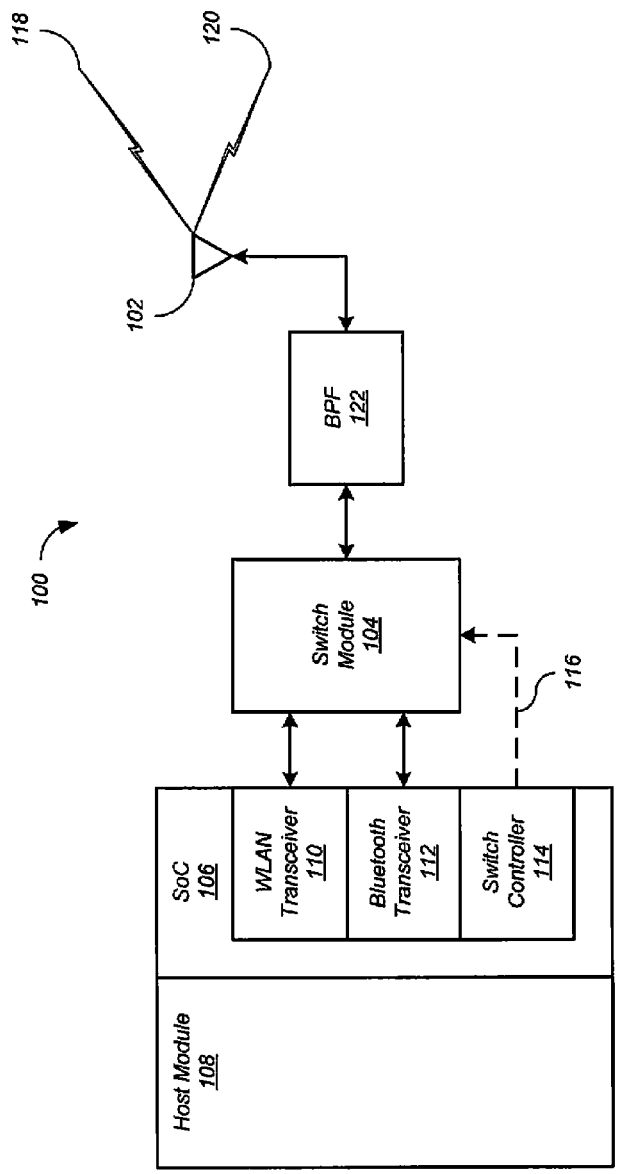
FIG. 1 shows elements of a dual-technology wireless communication device according to one implementation.

FIG. 1 shows elements of a dual-technology wireless communication device 100 having a share antenna according to one implementation. Although in the described implementations, the elements of device 100 are presented in one arrangement, other implementations may feature other arrangements, as will be apparent to one skilled in the relevant arts based on the disclosure and teachings provided herein. For example, elements of device 100 can be implemented in hardware, software, or combinations thereof. In some implementations, device 100 is compliant with all or part of IEEE standard 802.11, including draft and approved amendments 802.11b and 802.11g, and with the Bluetooth standard issued by the Bluetooth Special Interest Group.

Referring to FIG. 1, dual-technology wireless communication device 100 includes a radio-frequency (RF) antenna 102, a switch module 104 electrically coupled to antenna 102, a dual-technology wireless communication system-on-chip (SoC) 106 electrically coupled to switch module 104, and a host module 108 in communication with SoC 106. Dual-technology wireless communication device 100 can be implemented as any sort of device, for example including mobile telephones, personal digital assistants (PDAs), personal computers, and the like. Antenna 102 can be implemented in any manner. Host module 108 can be implemented in any manner, and can interface with SoC 106 using any sort of interface, for example including Secure Digital Input/Output (SDIO), Universal Serial Bus (USB), universal asynchronous receiver/transmitter (UART), and the like.

Antenna 102 is in communication with wireless WLAN signals 118 and wireless Bluetooth signals 120. A band-pass filter (BPF) 122 can be provided between antenna 102 and switch module 104. SoC 106 includes a wireless local-area network (WLAN) transceiver 110, a Bluetooth transceiver 112, and a switch controller 114 adapted to provide switch control signals 116 to switch module 104. However, the elements of SoC 106 can be implemented separately if desired. In addition, Bluetooth transceivers generally have differential outputs that are terminated with a balun. However, for clarity the balun is not shown in this description. Switch module 104 selectively electrically couples WLAN transceiver 110 and Bluetooth transceiver 112 to antenna 102 in accordance with switch control signals 116, for example as described for the implementations presented below.

Figure 2:
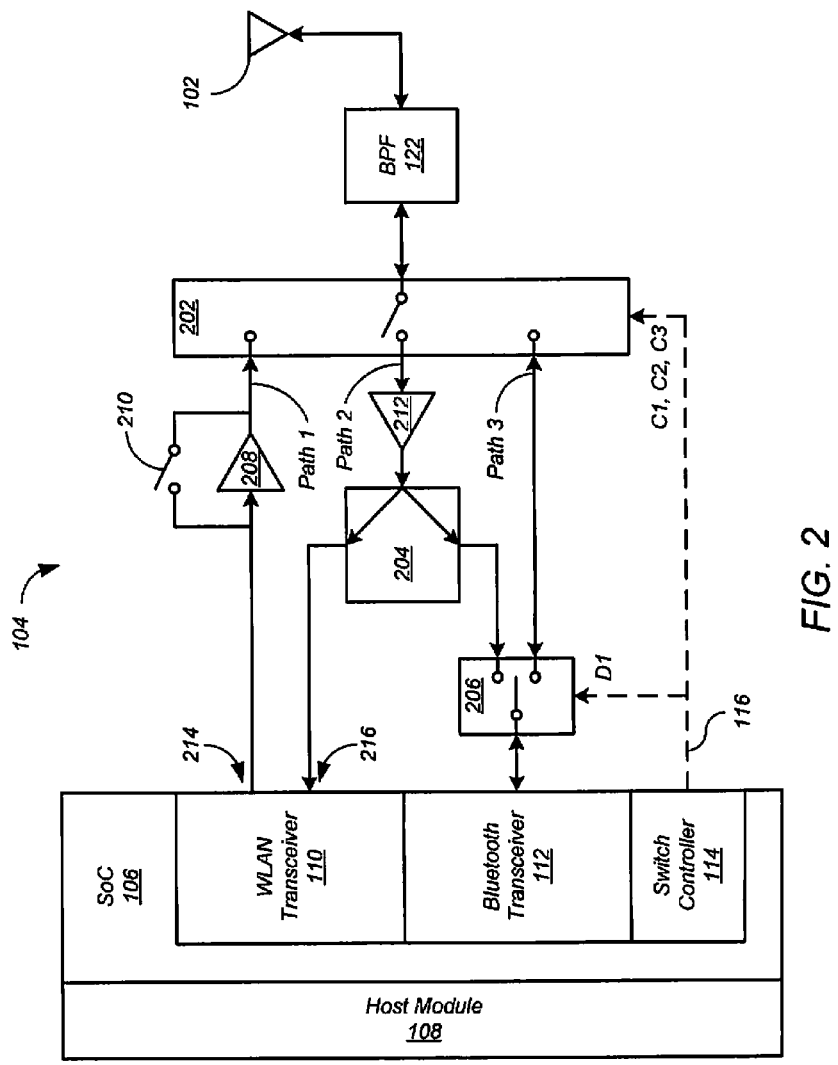
FIG. 2 shows detail of the dual-technology wireless communication device of FIG. 1 according to a first implementation.

FIG. 2 shows detail of dual-technology wireless communication device 100 of FIG. 1 according to a first implementation. Referring to FIG. 2, switch module 104 includes a single-pole triple-throw (SP3T) switch 202, a RF divider 204, a single-pole double-throw (SPDT) switch 206, a power amplifier (PA) 208, a bypass switch 210, and a low-noise amplifier (LNA) 212, also accompanied by a bypass switch to avoid front-end saturation in the presence of strong radio signals. Each of these elements can be implemented in a conventional manner. LNA 212 improves the signal quality of the incoming signal by means of amplification under a lower noise environment. The resulting signal, when fed through divider 204, will experience half the power loss in each of the divided paths.

The common node of SP3T switch 202 is electrically coupled to antenna 102 (via BPF 122). A first switched node of SP3T switch 202 is electrically coupled to a transmit node 214 of WLAN transceiver 110 (via PA 208). A second switched node of SP3T switch 202 is electrically coupled to the input of divider 204 (via LNA 212). A first output of divider 204 is electrically coupled to a receive node 216 of WLAN transceiver 110.

The common node of SPDT switch 206 is electrically coupled to Bluetooth transceiver 112. A first switched node of SPDT switch 206 is electrically coupled to a second output of divider 204. A second switched node of SPDT switch 206 is electrically coupled to a third switched node of SP3T switch 202.

SP3T switch 202 operates according to control signals C1, C2, and C3, thereby providing three signal paths labeled path 1, path 2, and path 3, as shown in FIG. 2. Path 1 is dedicated to WLAN transmissions only. This arrangement avoids power losses prior to transmission from antenna 102. PA 208 amplifies the WLAN transmissions, but can be bypassed (by switch 210) to reduce interference with Bluetooth reception.

Path 2 is capable of receiving WLAN signals and Bluetooth signals simultaneously. RF divider 204 enables SoC 106 to receive both types of signal simultaneously. LNA 212 compensates for the signal losses suffered by these signals at the other elements on path 2, for example such as at SP3T switch 202, divider 204, and SPDT switch 206.

Paths 2 and 3 are further multiplexed by SPDT switch 206, which is controlled by switch control signal D1. Signal D1 can replaced by two separate (or derived) control signals when SPDT switch 206 requires two discrete inputs. In this case, one control signal can be implemented as the logical NOT of the other control signal.

Path 3 serves three functions. When the WLAN link is active, path 3 is dedicated to Bluetooth transmission only. When the WLAN link is active, but in a power save state (also referred to as a doze state), path 3 is dedicated to Bluetooth transmission as well as reception. When the WLAN link is inactive, (that is, the WLAN is switched OFF), path 3 is used for Bluetooth transmission as well as reception.

Switch controller 114 provides switch control signals D1, C1, C2, and C3, shown collectively as switch control signals 116. Switch controller 114 can be configured based on the type of Bluetooth traffic, the type of WLAN traffic, and the respective operational states of WLAN transceiver 110 and Bluetooth transceiver 112. Tables 1 and 2 show logical truth tables for switch control signals 116 for the implementation of FIG. 2. Table 1 shows the paths used with WLAN transceiver 110 either transmitting (TX) or receiving (RX), and with Bluetooth (BT) transceiver 112 in either an Awake or OFF state. Table 2 shows the paths used when Bluetooth transceiver 112 is transmitting (TX) or receiving (RX), and with WLAN transceiver 110 in Awake, Sleep, or OFF states. Awake states are also known as Idle states. In other words the transceiver 110, 112 is powered up, but is not maintaining an active link with another device.

In both tables, a value of "1" for a switch control signal C1, C2, or C3 indicates that the common node of SP3T switch 202 should be switched to the respective switched node of SP3T switch 202. For example, when C1=1, SP3T switch 202 should be coupled to path 1. Also in both tables, a value of "1" for switch control signal D1 indicates that the common node of for SPDT switch 206 should be switched to path 2, while a value of "0" indicates that the common node should be switched to path 3. Values of "X" represent "don't care" switch states.

TABLE 1

|  | WLAN TX BT awake | WLAN TX BT OFF | WLAN RX BT awake | WLAN RX BT OFF |
| --- | --- | --- | --- | --- |
| SP3T C1 | 1 | 1 | 0 | 0 |
| SP3T C2 | 0 | 0 | 1 | 1 |
| SP3T C3 | 0 | 0 | 0 | 0 |
| SPDT D1 | X | X | X | X |
| Results | path 1 | path 1 | path 2 | path 2 |

TABLE 2

|  | BT TX WLAN awake | BT TX WLAN sleep | BT TX WLAN OFF | BT RX WLAN awake | BT RX WLAN sleep | BT RX WLAN OFF |
|---|---|---|---|---|---|---|
| SP3T C1 | 0 | 0 | 0 | 0 | 0 | 0 |
| SP3T C2 | 0 | 0 | 0 | 1 | 0 | 0 |
| SP3T C3 | 1 | 1 | 1 | 0 | 1 | 1 |
| SPDT D1 | 1 | 1 | 1 | 0 | 1 | 1 |
| Results | path 3 | path 3 | path 3 | path 2 | path 3 | path 3 |

Table 3 shows switch transitions for switches 202, 206 of FIG. 2 to achieve state transitions for WLAN transceiver 110 and Bluetooth transceiver 112. The reverse transitions also apply in the reverse direction for the switch transitions of Table 3. The three state transitions shown in Table 3 are from Bluetooth transmitting to WLAN transmitting (BT_TX=>WL_TX), from Bluetooth receiving to WLAN transmitting (BT_RX=>WL_TX), and from WLAN receiving to Bluetooth transmitting (WL_RX=>BT_TX). It should be noted that no switch transitions are required for the transceiver transitions from Bluetooth receiving to WLAN transmitting (BT_RX=>WLAN_RX), and from WLAN receiving to Bluetooth receiving (WLAN_RX=>BT_RX). Furthermore, the default state of SP3T switch 202 is to path 2. Therefore, SP3T switch 202 switches back to path 2 once a request for a particular transmission or reception is complete.

TABLE 3

|  | BT_TX => WL_TX | BT_RX => WL_TX | WL_RX => BT_TX |
|---|---|---|---|
| SP3T C1 | 0 => 1 | 0 => 1 | 0 => 0 |
| SP3T C2 | 0 => 0 | 1 => 0 | 1 => 0 |
| SP3T C3 | 1 => 0 | 0 => 0 | 0 => 1 |
| SPDT D1 | 1 => X | X => X | X => 1 |
| Results | path 3 to path 1 | path 2 to path 1 | path 2 to path 3 |

Figure 3:
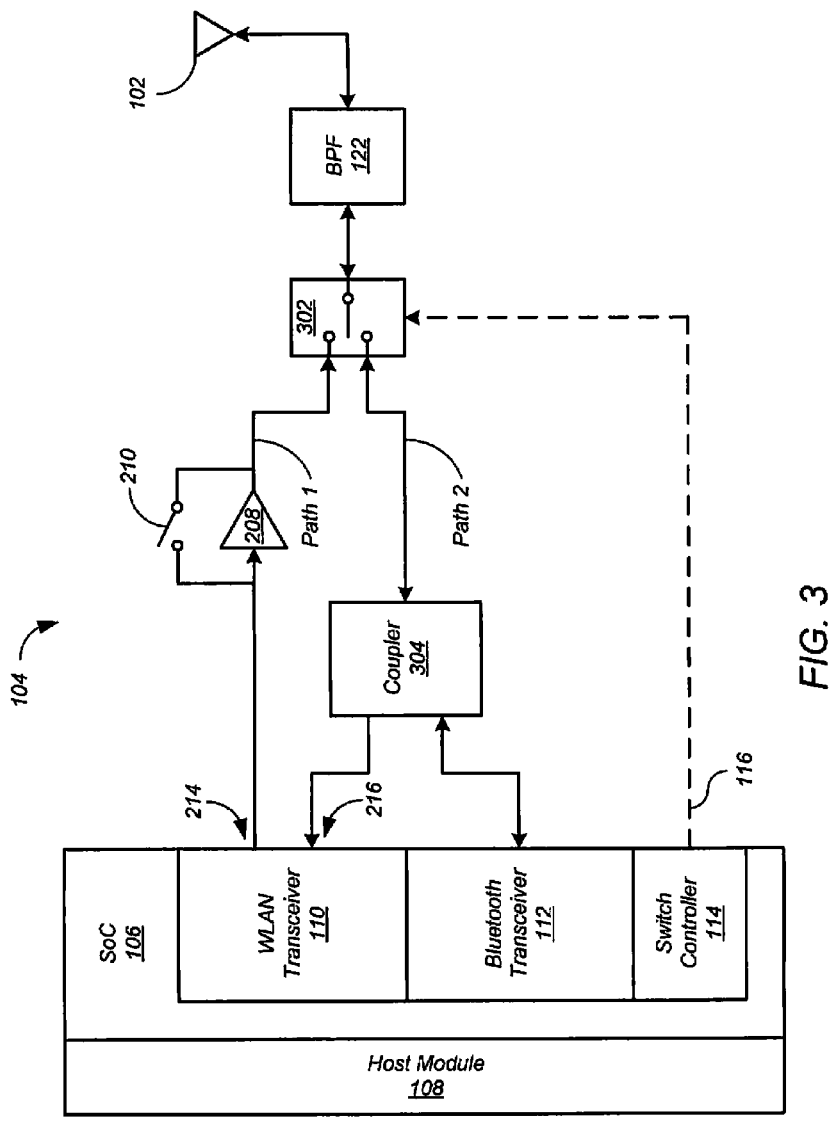
FIG. 3 shows detail of the dual-technology wireless communication device of FIG. 1 according to a second implementation.

FIG. 3 shows detail of dual-technology wireless communication device 100 of FIG. 1 according to a second implementation. Referring to FIG. 3, switch module 104 includes a single-pole double-throw (SPDT) switch 302, and a coupler 304, as well as power amplifier (PA) 208 and bypass switch 210. Each of these elements can be implemented in a conventional manner. In one implementation, coupler has a loss of 6 dB at the node electrically coupled to transmit node 216 of WLAN transceiver 110, and a loss of 2 dB at the node electrically coupled to Bluetooth transceiver 112. Of course, other values can be used in other implementations.

The common node of SPDT switch 302 is electrically coupled to antenna 102 (via BPF 122). A first switched node of SPDT switch 302 is electrically coupled to transmit node 214 of WLAN transceiver 110 (via PA 208). A second switched node of SPDT switch 302 is electrically coupled to a first node of coupler 304. A second node of coupler 304 is electrically coupled to a receive node 216 of WLAN transceiver 110. A third node of coupler 304 is electrically coupled to Bluetooth transceiver 112.

SPDT switch 302 operates according to control signal 116, thereby providing two signal paths labeled path 1 and path 2, as shown in FIG. 3. Path 1 is dedicated to WLAN transmissions only. This arrangement avoids power losses prior to transmission from antenna 102. PA 208 amplifies the WLAN transmissions, but can be bypassed (by switch 210) to reduce interference with Bluetooth reception.

Path 2 is used for WLAN reception, and for Bluetooth transmission and reception. Wireless WLAN signals received by antenna 102 are switched by SPDT switch 302 to coupler 304, which passes the signals to receive node 216 of WLAN transceiver 110. Wireless Bluetooth signals received by antenna 102 are switched by SPDT switch 302 to coupler 304, which passes the signals to Bluetooth transceiver 112. Bluetooth transmissions from Bluetooth transceiver 112 are passed by coupler 304 to SPDT switch 302, which switches the signals to antenna 102.

Figure 4:
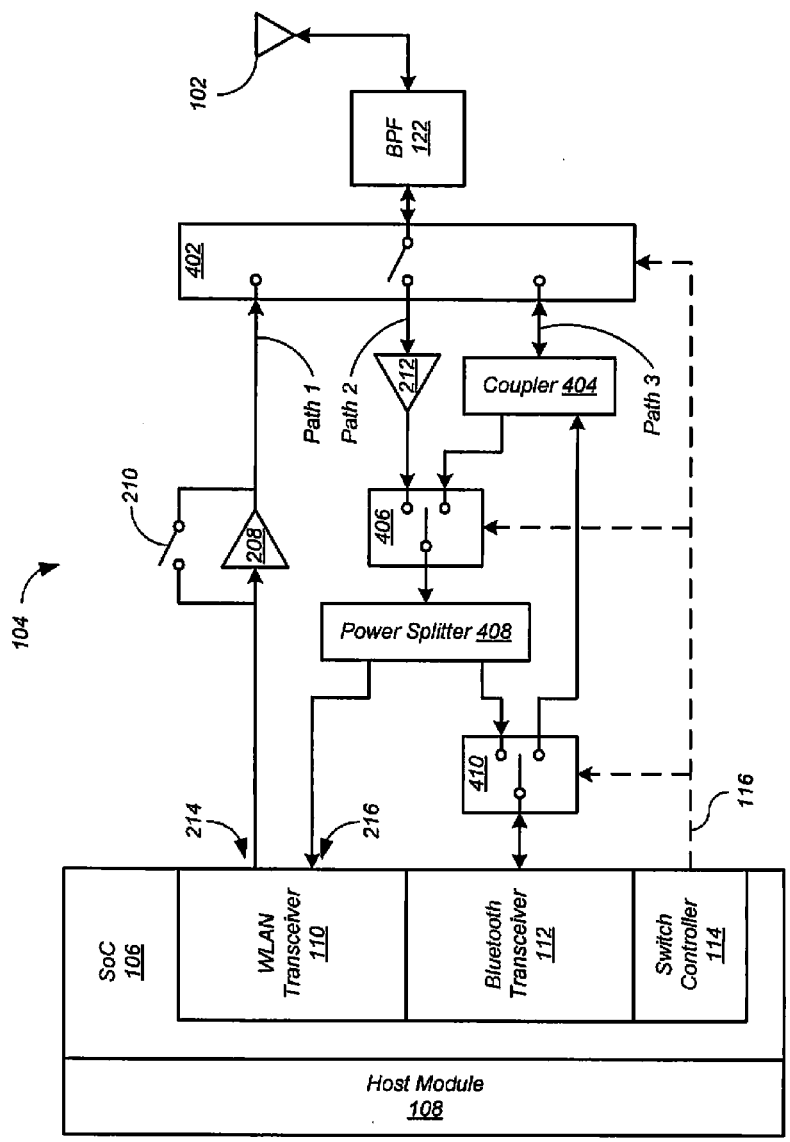
FIG. 4 shows detail of the dual-technology wireless communication device of FIG. 1 according to a third implementation.

FIG. 4 shows detail of dual-technology wireless communication device 100 of FIG. 1 according to a third implementation. Referring to FIG. 4, switch module 104 includes a single-pole triple-throw (SP3T) switch 402, a RF coupler 404, a first single-pole double-throw (SPDT) switch 406, an RF power splitter 408, and a second SPDT switch 410, as well as power amplifier (PA) 208, bypass switch 210, and low-noise amplifier (LNA) 212. Each of these elements can be implemented in a conventional manner.

Switches 402, 406, and 410 operate according to switch control signals 116 provided by switch controller 114. SP3T switch 402 provides three signal paths labeled paths 1, path 2, and path 3, as shown in FIG. 4. Path 1 is dedicated to WLAN transmissions only. This arrangement avoids power losses prior to transmission from antenna 102. PA 208 amplifies the WLAN transmissions, but can be bypassed (by switch 210) to reduce interference with Bluetooth reception.

Path 2 is capable of receiving WLAN signals and Bluetooth signals simultaneously. LNA 212 compensates for the signal losses suffered by these signals at the other elements on path 2, for example such as at SPDT switch 406, power splitter 408, and SPDT switch 410. Received WLAN and Bluetooth signals are switched by SPDT switch 406 to power splitter 408. One of the outputs of power splitter 408 is switched by SPDT switch 410 to Bluetooth transceiver 112. The other output of power splitter 408 is provided to receive node 216 of WLAN transceiver 110.

Path 3 is used for WLAN reception and Bluetooth transmission. Received WLAN signals are passed by coupler 404 to SPDT switch 406, where they are switched to power splitter 408, which provides the WLAN signals to receive node 216 of WLAN transceiver 110. Bluetooth transmissions from Bluetooth transceiver 112 are switched by SPDT switch 410 to coupler 404, which passes the signals to SP3T switch 402, where the signals are switched to antenna 102.

Figure 5:
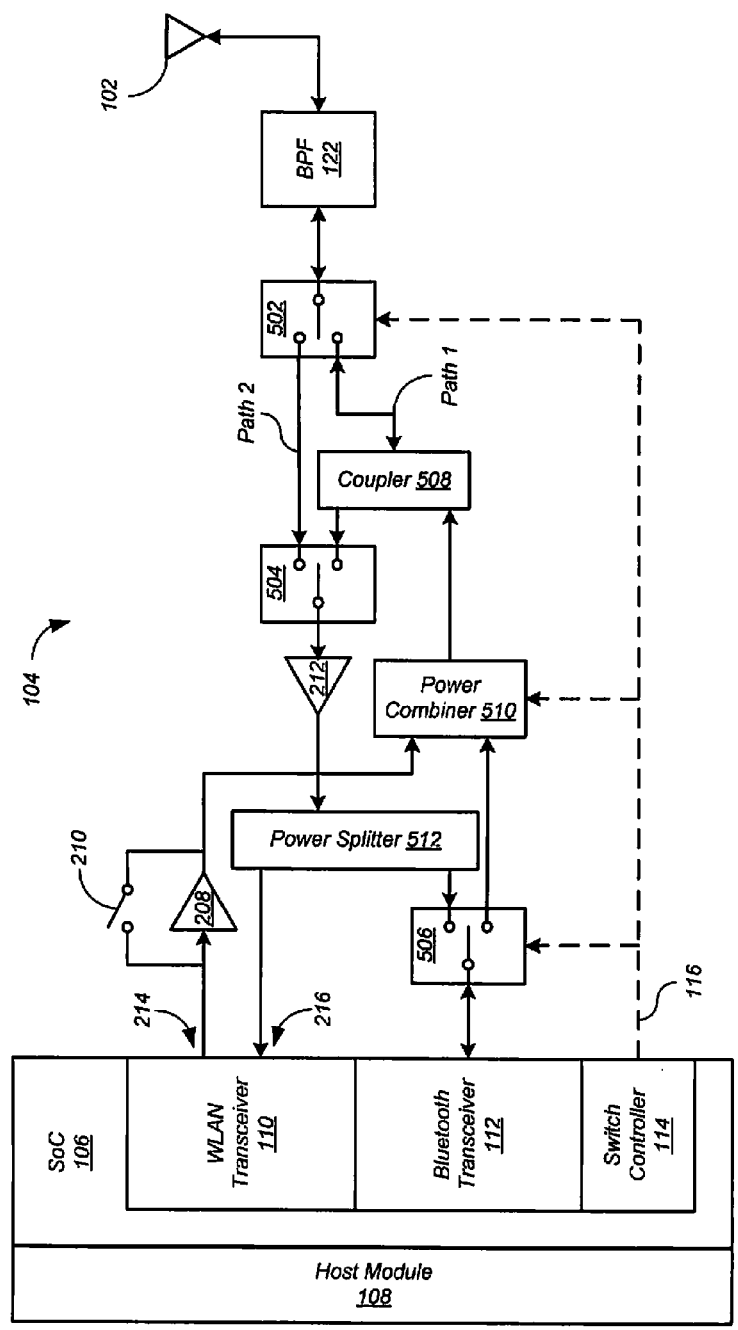
FIG. 5 shows detail of the dual-technology wireless communication device of FIG. 1 according to a fourth implementation.

FIG. 5 shows detail of dual-technology wireless communication device 100 of FIG. 1 according to a fourth implementation. Referring to FIG. 5, switch module 104 includes single-pole double-throw (SPDT) switches 502, 504, and 506, a coupler 508, a power combiner 510, and a power splitter 512, as well as power amplifier (PA) 208, bypass switch 210, and low-noise amplifier (LNA) 212. Each of these elements can be implemented in a conventional manner.

The common node of SPDT switch 502 is electrically coupled to antenna 102 (via BPF 122). A first switched node of SPDT switch 502 is electrically coupled to a first node of coupler 508. A second switched node of SPDT switch 502 is electrically coupled to a first switched node of SPDT switch 504. The common node of SPDT switch 504 is electrically coupled to the input of power splitter 512 (via LNA 212).

A second node of coupler 508 is electrically coupled to a second switched node of SPDT switch 504. A third node of coupler 508 is electrically coupled to the output of power combiner 510. A first input of power combiner 510 is electrically coupled to transmit node 214 of WLAN transceiver 110 (via PA 208). A second input of power combiner 510 is electrically coupled to a first switched node of SPDT switch 506.

A first output of power splitter 512 is electrically coupled to receive node 216 of WLAN transceiver 110. A second output of power splitter 512 is electrically coupled to a second switched terminal of SPDT switch 506. The common node of SPDT switch 506 is electrically coupled to Bluetooth transceiver 112.

SPDT switches 502, 504, and 506 operate according to switch control signals 116 provided by switch controller 114. SPDT switch 502 provides two signal paths labeled path 1 and path 2, as shown in FIG. 3. Path 1 can be used for transmission and reception of WLAN and Bluetooth signals. Path 2 can be used for reception of WLAN and Bluetooth signals.

WLAN transmissions from WLAN transceiver 110 are passed by power combiner 510 and coupler 508 to SPDT switch 502, which switches the WLAN transmissions to antenna 102. Wireless WLAN signals received by antenna 102 can be switched by SPDT switch 502 either directly to SPDT switch 504 (path 2) or via coupler 508 (path 1). From SPDT switch 504 the received WLAN signals are passed by power splitter 512 to receive node 216 of WLAN transceiver 110.

Bluetooth transmissions from Bluetooth transceiver 112 are switched by SPDT switch 506 to power combiner 510, which passes the signals via coupler 508 to SPDT switch 502 (path 1). SPDT switch 502 switches the signals to antenna 102. Wireless Bluetooth signals received by antenna 102 can be switched by SPDT switch 502 either directly to SPDT switch 504 (path 2) or via coupler 508 (path 1). From SPDT switch 504 the received Bluetooth signals are passed by power splitter 512 to SPDT switch 506, which switches the signals to Bluetooth transceiver 112.

According to some implementations, a device including both a wireless local-area network (WLAN) transceiver and a Bluetooth transceiver dynamically alters one or more transmission characteristics of one or both transceivers based on the frequency of the currently-selected Bluetooth frequency channel. For example, the characteristics can include the transmission power of the Bluetooth transceiver, the transmission power of the WLAN transceiver, the packet length of a packet transmitted by the WLAN transceiver, the data rate of a packet transmitted by the WLAN transceiver, link partner selection of the WLAN transceiver, and the like.

As described above, Bluetooth and WLAN use the same un-licensed 2.4 GHz ISM band. To reduce interference between these technologies, the Bluetooth Special Interest Group (SIG) has developed a technique known as Adaptive Frequency Hopping (AFH). Without AFH, a Bluetooth transceiver hops across 79 frequency channels in the ISM band according to a predetermined frequency-hopping pattern. Of these channels, 20 share frequencies with the WLAN portion of the ISM band. With AFH, these 20 channels are avoided, leaving 59 channels for Bluetooth use. Of these 59 channels, some are quite close in frequency to the WLAN band, while others are relatively distant. According to various implementations, these frequency differences can be exploited to improve the performance of the WLAN transceiver, the Bluetooth transceiver, or both.

Figure 6:
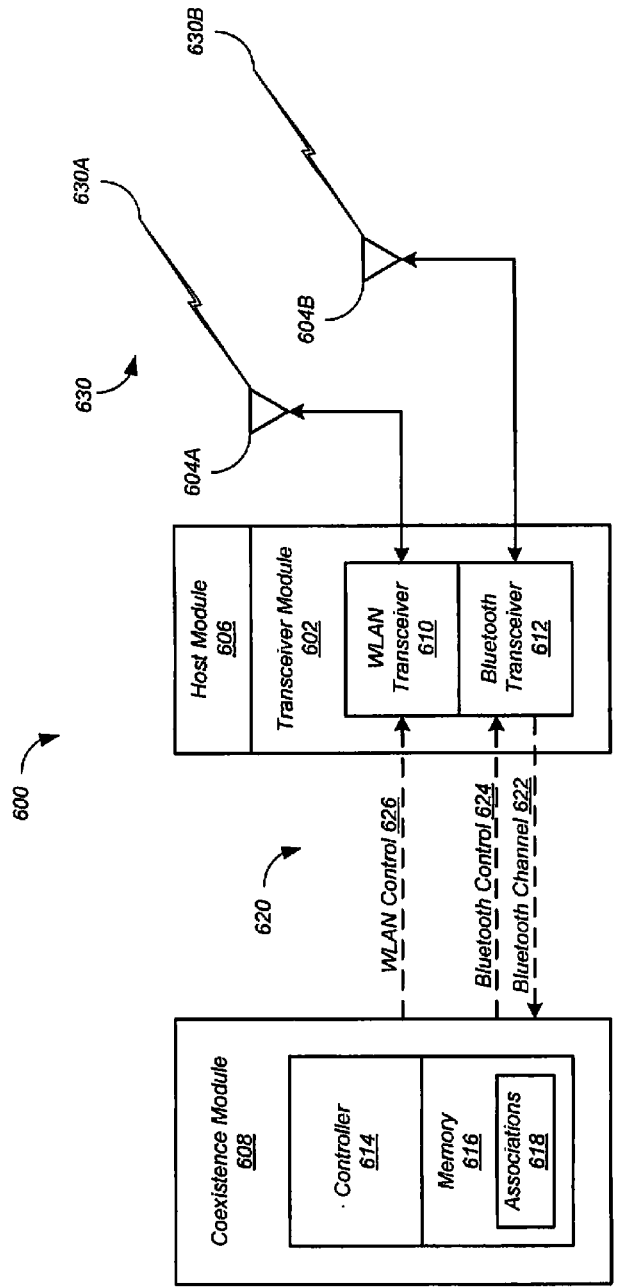
FIG. 6 shows elements of a dual-technology wireless communication device according to one implementation.

FIG. 6 shows elements of a dual-technology wireless communication device 600 according to one implementation. Although in the described implementations, the elements of device 600 are presented in one arrangement, other implementations may feature other arrangements, as will be apparent to one skilled in the relevant arts based on the disclosure and teachings provided herein. For example, elements of device 600 can be implemented in hardware, software, or combinations thereof. In some implementations, device 600 is compliant with all or part of IEEE standard 802.11, including draft and approved amendments 802.11b and 802.11g, and with the Bluetooth standard issued by the Bluetooth Special Interest Group.

Referring to FIG. 6, dual-technology wireless communication device 600 includes a transceiver module 602 adapted to transceive wireless signals 630 via antennas 604A,B, as well as a host 606 and a coexistence module 608. Transceiver module 602 includes a WLAN transceiver 610 adapted to transceive WLAN signals via antenna 604A and a Bluetooth transceiver 612 adapted to transceive Bluetooth signals via antenna 604B. Coexistence module 608 includes a controller 614 and a memory 616 adapted to store associations 618 between the Bluetooth channels and the predetermined transmission characteristics, which are dynamically altered according to the frequency of the currently-selected Bluetooth channel, as described in detail below.

Coexistence module 608 and transceiver module 602 exchange signals 620, including Bluetooth channel signals 622, Bluetooth control signals 624, and WLAN control signals 626. Bluetooth transceiver 612 provides Bluetooth channel signals 622, which provide the Bluetooth frequency-hopping pattern to coexistence module 608. Based on the Bluetooth frequency-hopping pattern, coexistence module 608 provides Bluetooth control signals 624 to Bluetooth transceiver 612 and/or provides WLAN control signals 626 to WLAN transceiver 610. In response to Bluetooth control signals 624, Bluetooth transceiver 612 dynamically alters its transmission characteristics. Similarly, in response to WLAN control signals 626, WLAN transceiver 610 dynamically alters its transmission characteristics.

Figure 7:
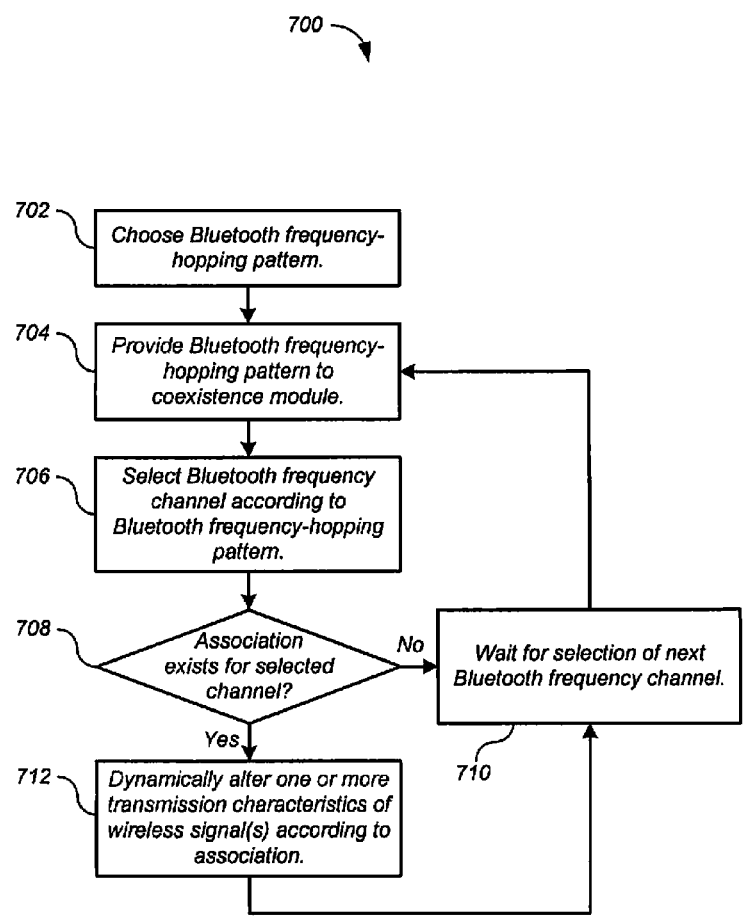
FIG. 7 shows a process for dual-technology wireless communication device 600 of FIG. 6 according to one implementation.

FIG. 7 shows a process 700 for dual-technology wireless communication device 600 of FIG. 6 according to one implementation. Although in the described implementations, the elements of process 700 are presented in one arrangement, other implementations may feature other arrangements, as will be apparent to one skilled in the relevant arts based on the disclosure and teachings provided herein. For example, in various implementations, some or all of the steps of process 700 can be executed in a different order, concurrently, and the like. In some implementations, device 600 is compliant with all or part of IEEE standard 802.11, including draft and approved amendments 802.11b and 802.11g, and with the Bluetooth standard issued by the Bluetooth Special Interest Group.

Referring to FIG. 7, Bluetooth transceiver 612 chooses a frequency-hopping pattern (step 702). The frequency-hopping pattern indicates a selected Bluetooth frequency channel for each time slot in the pattern. Bluetooth transceiver 612 operates on the Bluetooth frequency channels according to the pattern. Bluetooth transceiver 612 may employ Adaptive Frequency Hopping, and so avoids channels where interference is present, in particular channels that share frequencies with the WLAN portion of the ISM band, thereby avoiding interference between WLAN signals 630A and Bluetooth signals 630B. Bluetooth transceiver 612 provides this frequency-hopping pattern to coexistence module 608 in the form of Bluetooth channel signals 622 (step 704).

Based on the Bluetooth frequency-hopping pattern, coexistence module 608 causes transceiver module 602 to dynamically alter one or more transmission characteristics of wireless signals 630 based on the frequency of the selected Bluetooth channel. That is, when Bluetooth transceiver 612 selects a particular frequency channel, coexistence module 608 causes transceiver module 602 to dynamically alter one or more transmission characteristics of wireless signals 630 based on the frequency of that channel.

In operation, Bluetooth transceiver 612 selects a particular frequency channel according to the frequency-hopping pattern (step 706). Controller 614 of coexistence module 608 determines whether an association 618 exists in memory 616 for the selected frequency channel (step 708). In some implementations, transmission characteristics of wireless signals 630 are not altered for every channel. Therefore, if no association 618 exists for the selected frequency channel, controller 614 takes no action, and waits for the selection of the next Bluetooth frequency channel (step 710).

However, if an association 618 exists for the selected frequency channel (step 708), controller 614 causes transceiver module 602 to dynamically alter one or more transmission characteristics of wireless signals 630 according to the association 618 for that channel (step 712). Controller 614 then waits for the selection of the next Bluetooth frequency channel (step 710).

The characteristics can include the transmission power of Bluetooth transceiver 612, the transmission power of WLAN transceiver 610, the packet length of a packet transmitted by WLAN transceiver 610, the data rate of a packet transmitted by the WLAN transceiver 610, link partner selection of the WLAN transceiver 610, and the like. For example, for a frequency channel that is close in frequency to the WLAN band, the association 618 can indicate a relatively low transmission power for Bluetooth transceiver 612 and/or WLAN transceiver 610 in order to reduce mutual interference. Conversely, for a frequency channel that is distant in frequency from the WLAN band, mutual interference is lower, so the association 618 can indicate a relatively high transmission power for Bluetooth transceiver 612 and/or WLAN transceiver 610.

WLAN transceiver 610 can also base selection of its link partner on the frequency of the current Bluetooth channel. For example, when the current Bluetooth frequency channel is relatively distant in frequency from the WLAN band, WLAN transceiver 610 can employ higher transmission power, and so can communicate with link partners that have weaker signals due to distance or other factors.

Data rates and/or packet lengths employed by WLAN transceiver 610 can also be changed based on the frequency of the current Bluetooth channel. WLAN transceiver 610 can employ greater packet lengths and data rates when the current Bluetooth frequency channel is relatively distant in frequency from the WLAN band, and can reduce these parameters as the frequency of the current Bluetooth channel approaches the WLAN band frequency.

Various implementations can employ a number of variations. In some implementations, instead of using stored associations 618 to alter transmission characteristics, other techniques can be used. For example, the transmission characteristics can be by calculated as needed by controller 614. In some implementations, Bluetooth channel signals 622 can indicate the current Bluetooth channel only, rather than the entire frequency-hopping pattern. Bluetooth transceiver 612 and WLAN transceiver 610 can share a single antenna, for example as described above with reference to FIGS. 1-5. Other variations will be apparent after reading this disclosure.

Various implementations can be implemented in digital electronic circuitry, or in computer hardware, firmware, software, or in combinations of them. Implementations can be implemented in a computer program product tangibly embodied in a machine-readable storage device for execution by a programmable processor; and method steps can be performed by a programmable processor executing a program of instructions to perform functions by operating on input data and generating output. Implementations can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:
1. A wireless communication device comprising:
a first transceiver configured to transmit a first signal, wherein the first transceiver operates according to a first wireless communication standard;
a second transceiver configured to (i) select a first channel of a plurality of channels, and (ii) transmit a second signal on the first channel, wherein the second transceiver operates according to a second wireless communication standard, and wherein the first channel is associated with a frequency;
a coexistence module configured to, based on the frequency of the first channel, i) alter a transmission characteristic of the first signal to be transmitted by the first transceiver, and ii) alter a transmission characteristic of the second signal to be transmitted by the second transceiver,
wherein the transmission characteristic of the first signal and the transmission characteristic of the second signal, as altered by the coexistence module, prevents interference (i) between the first signal and a signal received by the second transceiver, and (ii) between the second signal and a signal received by the first transceiver;
a plurality of switches comprising
a first switch comprising
a first node connected to an antenna,
a second node, and
a third node,
a second switch comprising
a first node connected to the second node of the first switch,
a second node connected to the third node of the first switch, and
a third node connected to the first transceiver, and
a third switch comprising
a first node connected to the third node of the second switch, a second node connected to the third node of the first switch, and
a third node connected to the second transceiver; and
a switch controller configured to generate a plurality of control signals to change states of the plurality of switches to connect the first transceiver or the second transceiver to the antenna.

2. The wireless communication device of claim 1, wherein:
the first wireless communication standard is a wireless local-area network standard; and
the second wireless communication standard is a Bluetooth standard.

3. The wireless communication device of claim 1, wherein:
the first transceiver is configured to generate the first signal to satisfy wireless local-area network communication protocols; and
the second transceiver is configured to generate the second signal to satisfy Bluetooth communication protocols.

4. The wireless communication device of claim 1, wherein the second transceiver is configured to:
select a frequency hopping pattern; and
select the first channel of the plurality of channels i) according to the frequency hopping pattern, and ii) to prevent interference between the first signal and the second signal.

5. The wireless communication device of claim 1, wherein the transmission characteristic of the first signal is one of:
a transmission power of the first transceiver;
a packet length of a packet transmitted by the first transceiver; or
a data rate of a packet transmitted by the first transceiver.

6. The wireless communication device of claim 1, wherein the transmission characteristic of the second signal is a transmission power of the second transceiver.

7. The wireless communication device of claim 1, wherein:
the coexistence module comprises a memory;
the memory is configured to store associations between transmission characteristics and respective ones of the plurality of channels;
the transmission characteristics include the transmission characteristic of the first signal and the transmission characteristic of the second signal; and
the coexistence module is configured to alter, according to the associations, the transmission characteristic of the first signal and the transmission characteristic of the second signal.

8. The wireless communication device of claim 7, wherein the coexistence module is configured to:
determine if an association is stored in the memory for the first channel; and
refrain from altering the transmission characteristic of the second signal in response to an association for the first channel not being stored in the memory.

9. The wireless communication device of claim 8, wherein the coexistence module is configured to:
wait for a selection of a next one of the plurality of channels by the second transceiver in response to an association for the first channel not being stored in the memory; and
adjust the transmission characteristic of the second signal in response to an association for the next one of the plurality of channels being stored in the memory.

10. The wireless communication device of claim 1, further comprising a switch module configured to, based on the plurality of control signals, change states of the plurality of switches to connect the first transceiver or the second transceiver to the antenna.

11. The wireless communication device of claim 1, wherein the first switch comprises a fourth node connected to the first transceiver.

12. The wireless communication device of claim 11, wherein the first transceiver is configured to:
transmit the first signal via
the first node of the first switch,
the fourth node of the first switch, and
the antenna; and
receive a third signal via
the first node of the first switch,
the second node of the first switch,
the first node of the second switch,
the third node of the second switch, and
the antenna.

13. The wireless communication device of claim 1, wherein the second transceiver is configured to receive a third signal via:
the first node of the third switch;
the third node of the third switch;
the second node of the second switch;
the third node of the second switch;
the first node of the first switch;
the third node of the first switch; and
the antenna.

14. The wireless communication device of claim 1, wherein the second transceiver is configured to transmit the second signal via:
the second node of the third switch;
the third node of the third switch;
the first node of the first switch;
the third node of the first switch; and
the antenna.

15. The wireless communication device of claim 1, further comprising:
a coupler comprising
a first node connected to the third node of the first switch,
a second node connected to the second node of the second switch, and
a third node; and
a power splitter comprising
a first node connected to the third node of the second switch,
a second node connected to the first transceiver, and
a third node connected to the first node of the third switch.

16. The wireless communication device of claim 1, wherein:
the first switch is a single-pole triple-throw switch; and
the second switch and the third switch are single-pole double-throw switches.

17. The wireless communication device of claim 1, wherein the first transceiver is connected to the third node of the first switch.

18. The wireless communication device of claim 17, wherein the first transceiver is configured to receive a third signal via:
the first node of the first switch;
the third node of the first switch; and
the antenna.

19. The wireless communication device of claim 1, further comprising
a coupler comprising
a first node connected to the third node of the first switch,
a second node connected to the second node of the second switch, and
a third node;

a power combiner comprising
   a first node connected to the second node of the coupler,
   a second node connected to the first transceiver, and
   a third node connected to the second node of the third switch; and
a power splitter comprising
   a first node connected to the third node of the second switch,
   a second node connected to the first transceiver, and
   a third node connected to the first node of the third switch.

20. The wireless communication device of claim 1, wherein the first switch, the second switch, and the third switch are single-pole double-throw switches.

* * * * *